United States Patent
Willett

[15] 3,705,481
[45] Dec. 12, 1972

[54] SUGAR CANE TOPPER FOR V-CUTTER HARVESTER

[72] Inventor: Harold A. Willett, Thibodaux, La.

[73] Assignee: Cane Machinery & Engineering Company, Inc., Thibodaux, La.

[22] Filed: Dec. 28, 1970

[21] Appl. No.: 101,919

[52] U.S. Cl. .................56/13.9, 56/14.3, 56/63, 56/98
[51] Int. Cl. .............................A01d 45/10
[58] Field of Search.............56/13.7–13.9, 14.3, 56/14.5, 53, 56, 59, 63, 101, 102, 10.7, 98

[56] References Cited

UNITED STATES PATENTS

| | | |
|---|---|---|
| 3,587,214 | 6/1971 | Willett et al.............56/10.7 |
| 3,144,743 | 8/1964 | Gaunt et al.............56/14.3 |
| 3,002,330 | 10/1961 | Thomson.................56/13.7 |
| 3,307,338 | 3/1967 | Mizzi.....................56/13.9 |
| 1,065,296 | 6/1913 | Cozart....................56/59 |
| 3,095,680 | 7/1963 | Thornton.................56/13.7 |

Primary Examiner—Louis G. Mancene
Assistant Examiner—J. N. Eskovitz
Attorney—Wilkinson, Mawhinney & Theibault

[57] ABSTRACT

This disclosure is directed to a topping device for use with a V-cutter type sugar cane harvester in which the topping main frame unit is pivoted at its lead end to the lead end of the V-cutter and is provided with cane gathering means which present the cane stalks to topping discs which are effectively raised and lowered by a cylinder and ram mechanism connected between the topping main frame and the frame of the V-cutter harvester at a point rearwardly of the pivotal connection between the topping frame and harvester.

6 Claims, 5 Drawing Figures

INVENTOR
HAROLD A. WILLETT

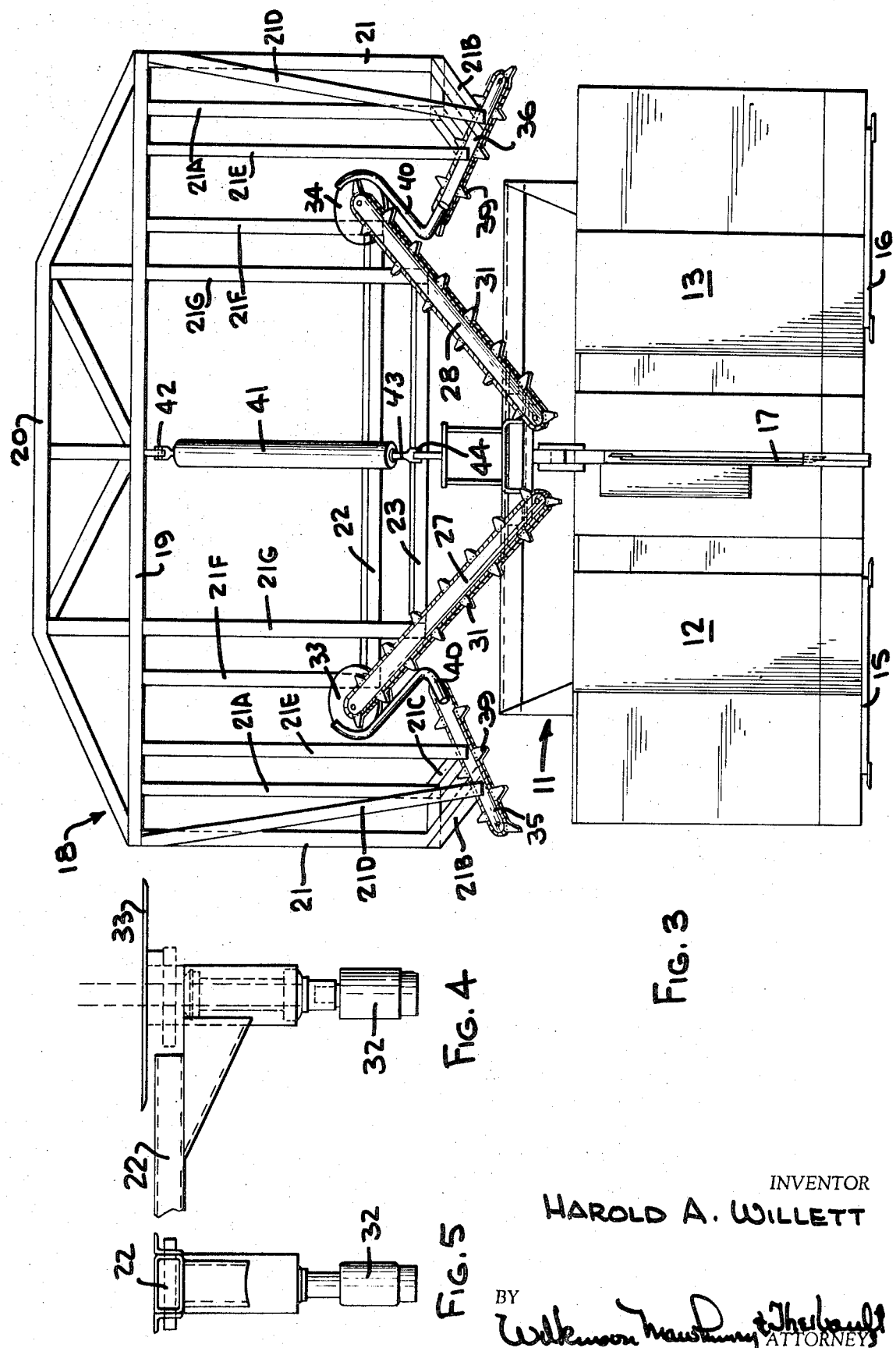

SUGAR CANE TOPPER FOR V-CUTTER HARVESTER

This invention relates to Sugar Cane Harvesters and in particular to a topping device for use with a V-cutter harvester.

As shown and described in copending U.S. Pat. application Ser. No. 60,535, now U.S. Pat. No. 3,587,214, of Harold A. Willett and Jacob A. Giardina for "SUGAR CANE HARVESTER" filed Aug. 3, 1970, owned by the assignee hereof, a new and improved cane harvester is shown in which a V-type cutter has a pair of vertical mold boards joined at their front and arranged in a divergent V at the rear. A rotary cutter is mounted at the base of each mold board proximate the mid point from front to rear and with the plane of cut being substantially at a right angle to the face of the mold board with the plane of cut being parallel to the ground surface over which the V-cutter is moved on a mobile frame through a sugar cane field.

The present invention is an improved topping device for the V-cutter type harvester which operates on two rows of cane simultaneously.

A further object of the present invention is the provision of a topper which is pivoted to the apex area of the V-cutter for up and down movement of its rear portion which carries the cane gathering chains and rotary cutting toppers positioned rearwardly of and above the V-cutter earth severing cutting discs for topping cane stalks cut thereby.

A further object of the present invention is the arrangement of cane gathering means above and in advance of the earth cutters to orient the upper portion of the cane stalks for presentation to the topping cutter discs after the stalks have been severed from the earth.

A still further object of the present invention is a topper for use with a V-cutter harvester the gathering and top cutting means of which may be regulated to permit the harvester to top only the upper portion of the cane stalk which the rate of maturity dictates should be cut and a topper which will operate on two rows of cane simultaneously.

With the foregoing and other objects in view, the invention will be more fully described hereinafter, and will be more particularly pointed out in the claims appended hereto.

In the drawings, wherein like symbols refer to like or corresponding parts throughout the several views:

FIG. 3 is a front elevational view of the topper of FIGS. 1 and 2 mounted on a V-cutter harvester.

FIG. 4 is a rear elevational view of the topping cutter and its driving motor.

FIG. 5 is an end elevational view of the motor mount of FIG. 4.

Figure 1:
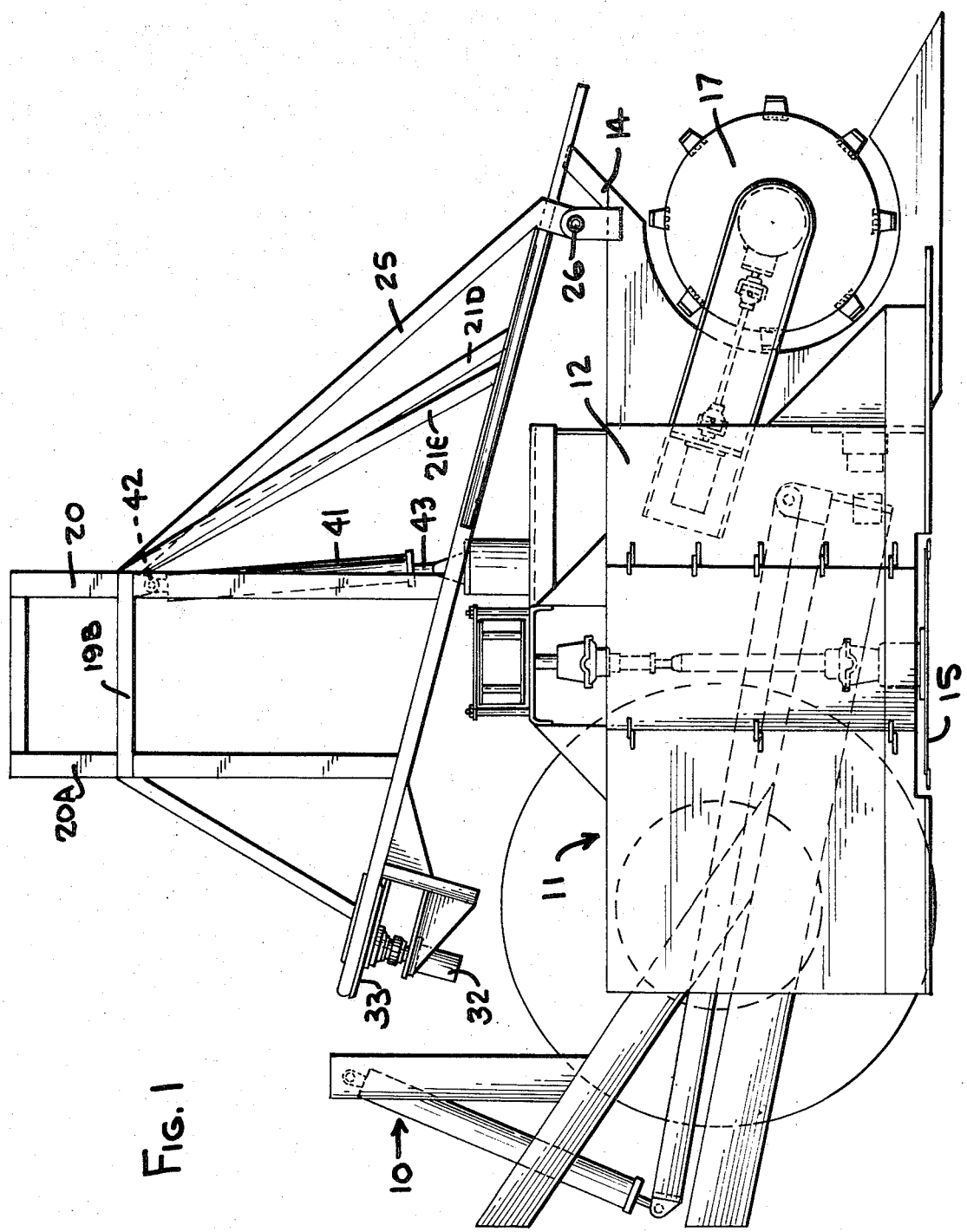
FIG. 1 is a side elevational view of the topper of the present invention shown installed on a V-cutter harvester.
Figure 2:
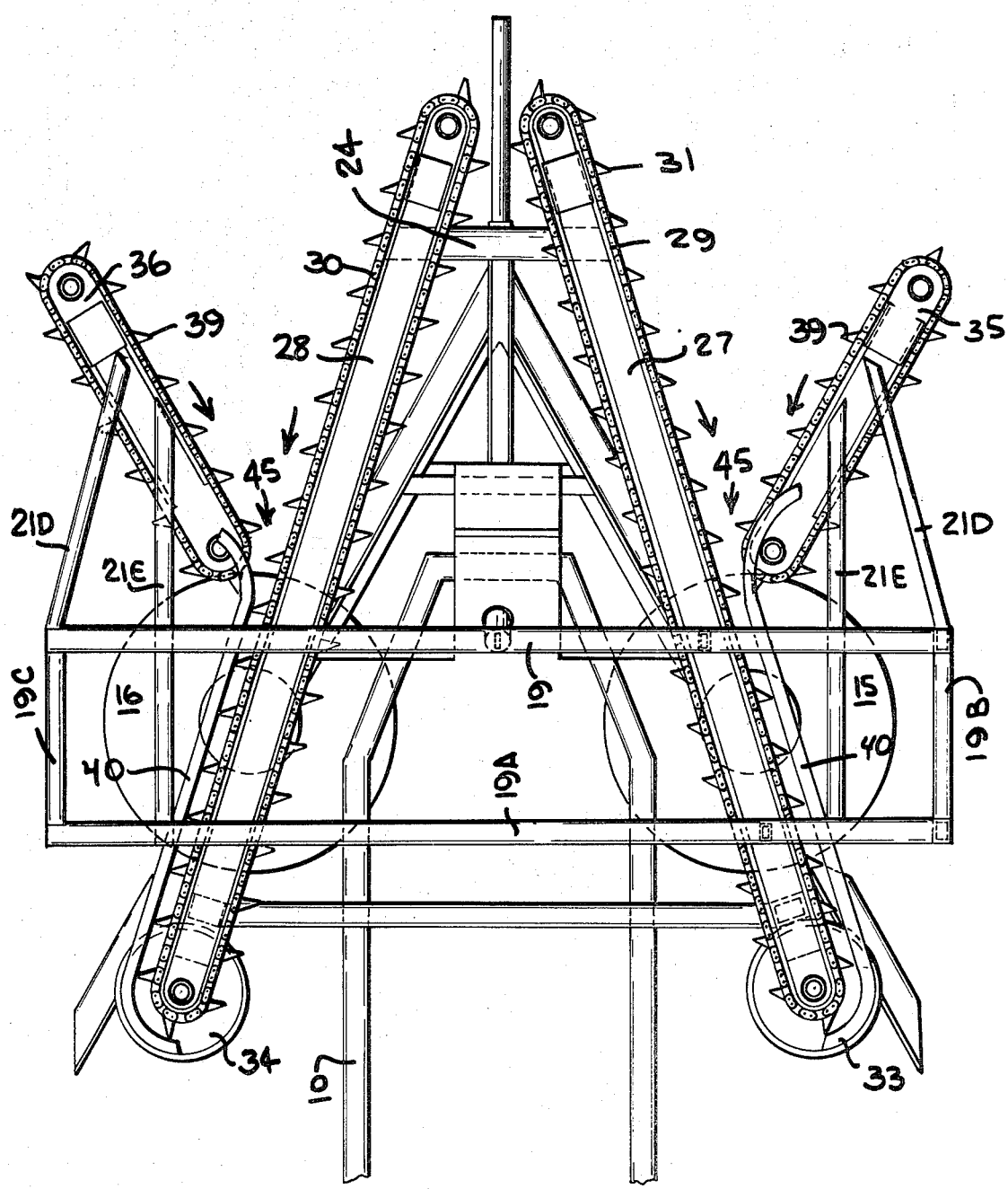
FIG. 2 is a top plan view of the topper of the present invention shown installed on the V-cutter harvester of FIG. 1.

Referring now to the drawings, 10 designates a mobile frame such as a tractor having a V-cutter harvester 11 mounted on its front end. The harvester has a pair of vertically disposed mold boards 12 and 13 joined at 14 to define the apex of a V and with the boards 12 and 13 diverging rearwardly as best seen in FIG. 2. A pair of hydraulically driven rotary cutters 15 and 16 are arranged, one in each leg of the V formed by mold boards 12 and 13 for cutting two rows of cane simultaneously as the V-shaped arrangement of mold boards are driven into the standing cane field like a wedge to open the cane and direct each standing row toward the earth cutters 15 and 16. A conventional vertically disposed parting cutter 17 is mounted at the apex of the V-cutter harvester.

The primary frame 18 consists of a rectangular sub frame 19, 19A, 19B and 19C having a pair of truss tops 20 and 20A on each side of the sub frame. Vertical support members 21, 21A extend to form support carriers for the secondary gathering means supports 21B and 21C, the free ends of which have secured thereto struts 21D and 21E which are secured to the sub frame 19. Depending from the rectangular sub frame 19 are vertical support members 21F and 21G which assist in supporting the primary gathering means. The members 21F on each side of the primary frame are joined by spacer 22 while the members 21G are joined by spacer 23. A pivotal housing 24 is carried by the free end of struts 25 for pivoting the main frame to the apex area of the V-cutter harvester at 26. This pivot 26 permits the primary frame to be raised and lowered in its rear area to raise or lower the topping means.

The primary cane gathering means comprises two support members 27 and 28 which are upwardly inclined and outwardly divergent when viewed from the front of the harvester. Endless chains 29 and 30 having cane gathering projections 31 extending therefrom are rooved about the supports 27, 28 and these chains are driven by the hydraulic motors 32 which also drive the topping disc cutters 33, 34 which define the topping means.

The secondary cane gathering means are two support members 35, 36 secured to and supported by members 21D and 21E. Endless chains 37 and 38 having cane engaging projections 39 are rooved about sprockets carried by the members 35, 36 and are driven by hydraulic motors in a conventional manner. The support members 35, 36 have guide pipes 40 at their upper convergent ends which cooperate with the endless chains 29 and 30 of the primary gathering means for directing the top of the cane stalks into cutting engagement with the topping disc cutters 33, 34.

The raising and lowering means comprises a cylinder 41 the free end of which is pivotally connected to the primary frame at 42 while its operating ram 43 is connected to the V-cutter frame at 44. This cylinder and ram rock the primary frame about the pivot 26 to effectively raise or lower the topping discs 33, 34 to regulate the amount of top to be removed from the cane stalk. In operation as the harvester proceeds into the cane field the mold boards 12 and 13 in their wedge like configuration engage and raise the cane stalks so that the primary gathering chains direct the stalk to a substantially erect position prior to being severed by the rotary cutters 15, 16. The secondary gathering chains cooperate to form a cane receiving throat 45 through which the cane passes in the erect position to be conveyed rearwardly and presented to the topping discs 33, 34 to have the appropriate amount of top removed. The harvester operator with the aid of a hydraulic control valve actuates the cylinder and ram 41 and 43 which causes the main frame 18 to rock about pivot 26 to regulate the length of cut from the top of the stalk as field conditions dictate.

What is claimed is:

1. For use with a V-cutter having a V-shaped mold board with at least one rotary cutter in each leg of the V for cutting rows of standing cane stalks, which V-cutter is mounted on a mobile frame for moving same through a field of standing cane, a cane topper comprising a primary frame pivoted at its leading end proximate the apex of the V-cutter to the V-cutter, primary cane gathering means carried by said primary frame and positioned to direct the cane upwardly and outwardly from the apex of the V-cutter, secondary cane gathering means carried by said primary frame and arranged to converge toward said primary gathering means to form a throat over the cane cutter in each leg of the V-cutter, topping means proximate the upper free end of each primary gathering means for cutting off the top of the cane stalks, and means connected between said primary frame and V-cutter rearwardly of the pivot to raise and lower the topping means relative to the V-cutter.

2. A cane topper as claimed in claim 1 wherein the primary frame is of arched construction to permit passage of two rows of cane therethrough.

3. A cane topper as claimed in claim 1 wherein said primary cane gathering means are endless chains having finger like projections for engaging cane stalks.

4. A cane topper as claimed in claim 1 wherein said secondary cane gathering means are endless chains upwardly inclined convergently and positioned to converge with the primary cane gathering means to form a conveyor to direct the cut cane stalks to the topping means.

5. A cane topper as claimed in claim 1 wherein the topping means are hydraulically driven rotary cutting discs.

6. A cane topper as claimed in claim 1 wherein the means for raising and lowering the topping means is a hydraulic cylinder and ram, the ram of which is connected to the V-cutter and the cylinder free end of which is pivotally connected to the primary frame forwardly of the topping means.

* * * * *